United States Patent [19]

Lu

[11] Patent Number: 5,222,321
[45] Date of Patent: Jun. 29, 1993

[54] FISHHOOK SINKER MADE OF IRON BY NON-DIE CASTING

[76] Inventor: Pang-Chou Lu, No. 444, Sec. 2, Chung Swe Rd., Sui Swe Hsing, Chunghua, Taiwan

[21] Appl. No.: 946,708

[22] Filed: Sep. 18, 1992

[51] Int. Cl.⁵ .............................................. A01K 91/00
[52] U.S. Cl. ................................... 43/42.53; 43/44.81
[58] Field of Search ................... 43/44.81, 44.9, 44.89, 43/42.53, 42.39, 42.45, 42.08, 42.35, 42.36, 42.37, 42.38

[56] References Cited

U.S. PATENT DOCUMENTS

| 167.687 | 9/1875 | Pitcher | 43/44.81 |
| 1,295,370 | 2/1919 | Porter | 43/44.81 |
| 1,357,678 | 11/1920 | Bain | 43/44.81 |
| 2,741,067 | 4/1956 | Cox | 43/44.9 |
| 3,497,987 | 3/1970 | Perrin | 43/42.53 |
| 4,713,907 | 12/1987 | Dudeck | 43/44.81 |
| 5,031,351 | 7/1991 | Rogel | 43/44.9 |
| 5,081,786 | 1/1992 | Cobb | 43/44.81 |

FOREIGN PATENT DOCUMENTS 2207841 2/1989 United Kingdom .

Primary Examiner—Mark Rosenbaum
Assistant Examiner—James Miner
Attorney, Agent, or Firm—Browdy and Neimark

[57] ABSTRACT

A fishhook sinker made of iron by forging comprises a first weight and a second weight, which are symmetrical in shape and have a flat side surface provided with an elongate slot and with at least a projection located at a position corresponding to a cavity that is situated onto a flat side surface of the counterpart weight. The projection is so dimensioned as to fit securely into the cavity in order to hold the first weight and the second weight together to form the fishhook sinker having a through hole formed by the two elongate slots and intended for use in receiving therein a fishing string.

6 Claims, 1 Drawing Sheet

FISHHOOK SINKER MADE OF IRON BY NON-DIE CASTING

BACKGROUND OF THE INVENTION

The present invention relates to a fishhook sinker, and more particularly to a fishhook sinker made of iron by non-die casting.

The conventional fishhook sinker of the prior art is generally made of lead by die casting because lead is a relatively soft material, which has a greater specific gravity and is capable of being molded easily into a variety of shapes. However, lead is a heavy metal, which can not be excreted easily by an animal once it is absorbed and deposited in the animal body. As a result, lead is a potential health hazard to a worker who makes the lead fishhook weight and is also a potential environmental pollutant responsible for the death of animals in general and birds in particular. For this reason, another kind of metal, such as iron, must be used to take the place of lead for the sake of protecting the ecological balance of the planet upon which we live.

As shown in FIG. 1, there are a variety of conventional fishhook sinkers 41, 42 and 43, each of which is provided with a through hole a1. As far as the sinkers 41 and 42 are concerned, the through hole a1 is used for a fishing string to pass through. The through hole a1 of the sinker 43 is so dimensioned as to permit a wound iron wire 431 to lodge therein to form an eye 432 located outside the through hole a1. The through hole a1 is made integrally with the lead sinker by die casting. In the case of an iron sinker, such through hole can not be easily punched or forged at the time when the iron sinker is made. For this reason, it is not economically feasible to use iron to take the place of lead in making a fishhook sinker. In addition, the cost of making the prior art sinker 43 is relatively high in view of the fact that the lodging of the iron wire 431 requires additional manual labor.

Another category of the prior art sinker 44 is also shown in FIG. 1. Such sinker 44 is not provided with a through hole. A fishhook 441 is held directly by the lead sinker 44 engulfing an end of the fishhook 441. Such method of attaching the fishhook 441 to the sinker 44 can not be done with an iron sinker. As a result, the iron sinker is not a workable substitute for the lead sinker.

Technically speaking, iron can be used to make the fishhook sinkers similar to those sinkers of the prior art as shown in FIG. 1. However, the iron sinkers are not competitive in terms of the price.

SUMMARY OF THE INVENTION

It is, therefore, the primary objective of the present invention to provide a fishhook sinker, which is made of iron economically in quantity by a method excluding the die casting.

It is another objective of the present invention to provide iron fishhook sinkers having a variety of shapes similar to those of the lead fishhook sinkers of the prior art.

The foregoing objectives, structures, and features of the present invention will be better understood by studying the following detailed description of the preferred embodiments of the present invention, in conjunction with the drawings provided herewith.

DETAILED DESCRIPTION OF THE PREFERRED EMBODIMENTS

Figure 1:
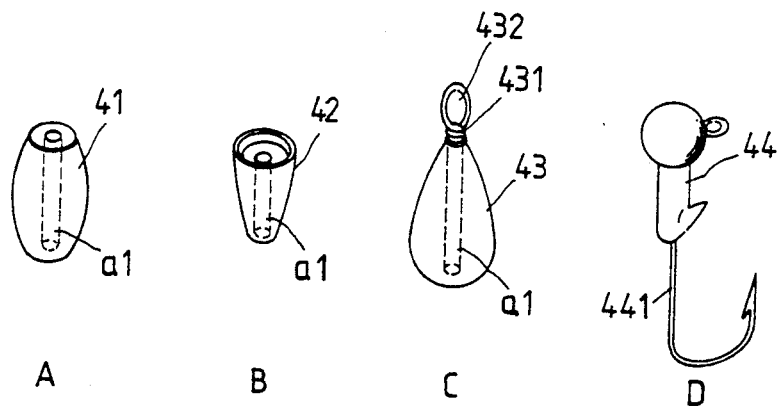
FIG. 1 shows perspective views of the lead fishhook sinkers of the prior art.
Figure 2:
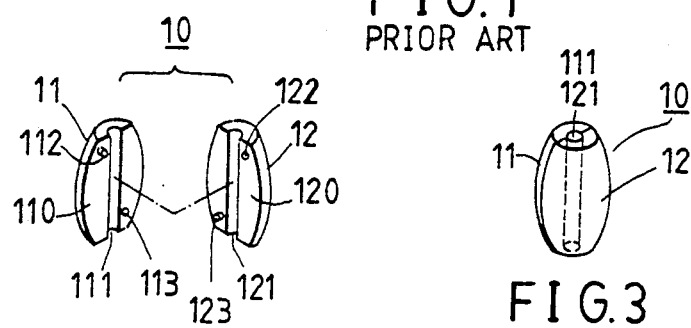
FIG. 2 shows an exploded view of a fishhook sinker made of iron by non-die casting, according to a first preferred embodiment of the present invention.
Figure 3:
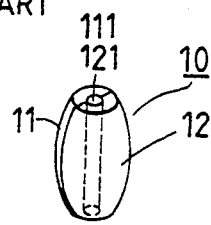
FIG. 3 shows a sectional view of the iron fishhook sinker in combination as shown in FIG. 2.

Referring to FIGS. 2 and 3, a sinker 10 of the first preferred embodiment of the present invention is shown comprising a first weight piece 11 and a second weight piece 12, which are symmetrical to each other. Both weight pieces 11 and 12 are oval in shape and provided respectively with flat side surfaces 110 and 120. The weight pieces 11 and 12 making up the sinker 10 are made of iron by forging. The flat side surfaces 110 and 120 are provided respectively with projections 112 and 123 and with cavities 113 and 122. The projection 112 of the first weight piece 11 and the cavity 122 of the second weight piece 12 are opposite to each other. In a similar arrangement, the projection 123 of the second weight piece 12 is opposite to the cavity 113 of the first weight piece 11. The depth of the two cavities 122 and 113 is slightly smaller than the height of the projections 112 and 123. Both flat side surfaces 110 and 120 are furnished respectively with the elongate slots 111 and 121.

In combination, the projections 112 and 123 are fitted into the cavities 122 and 113. The tips of the projections 112 and 123 are securely fused to the bottoms of the cavities 122 and 113 by electrifying the weight pieces 11 and 12. The sinker 10 is provided with a through hole which is formed by the elongate slots 111 and 121 for a fishing string to pass therethrough.

The iron sinker 10 of the present invention is similar in shape to the lead sinker of the prior art and can be made in quantity at a low cost by an automated forging system. In addition, the fishhook sinker 10 of the present invention is free from lead and is therefore consistent with the regulations of the environmental protection policy.

Figure 4:
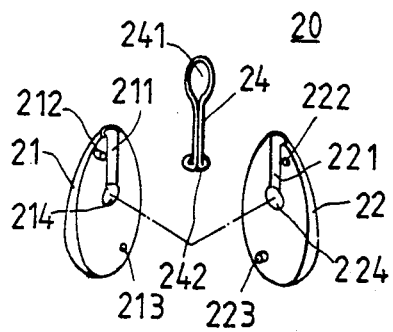
FIG. 4 shows an exploded view of a fishhook sinker made of iron by non-die casting, according to a second preferred embodiment of the present invention.
Figure 5:
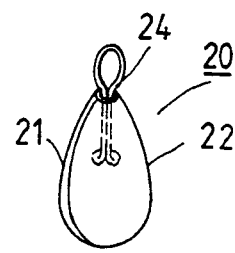
FIG. 5 shows a sectional view of the iron fishhook sinker in combination as shown in FIG. 4.

As shown in FIGS. 4 and 5, a fishhook sinker 20 of the second preferred embodiment of the present invention comprises two symmetrical weights 21 and 22, which are respectively provided with elongate slots 211 and 221, projections 212 and 223, and cavities 222 and 213. In other words, the sinker 20 is similar in structure to the sinker 10, with the difference being that the elongate slots 211 and 221 of the weights 21 and 22 are provided respectively with semi-circular holes 214 and 224. In addition, the sinker 20 comprises an iron eyelet device 24 provided with a loop 241 and a head 242 which is so dimensioned as to fit rotatably and securely into the semi-circular holes 214 and 224 of the weights 21 and 22. By comparison, the sinker 20 of the present invention is structurally simpler than the sinker 43 of the prior art and can be therefore made at a relatively low cost.

Figure 6:
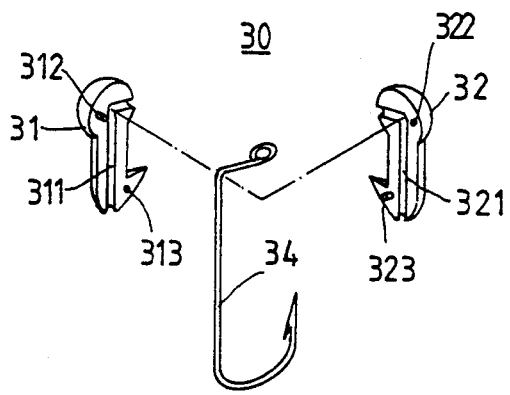
FIG. 6 shows an exploded view of a fishhook sinker made of iron by non-die casting, according to a third preferred embodiment of the present invention.
Figure 7:
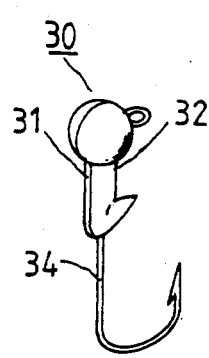
FIG. 7 shows a perspective view of the iron fishhook sinker in combination as shown in FIG. 6.

A fishhook sinker 30 of the third preferred embodiment of the present invention is illustrated in FIGS. 6 and 7. The sinker 30 is composed of two weights 31 and 32, which are provided respectively with elongate slots 311 and 321, projections 312 and 323, and cavities 322 and 313. The sinker 30 is also similar in structure to the sinkers 10 and 20, with the difference being that the elongate slots 311 and 321 have a curve which is so constructed as to receive therein a fishhook 34. In combination, the weights 31 and 32 of the sinker 30 holds securely the fishhook 34. In comparison with the sinker 44 of the prior art, the sinker 30 of the present invention has a relatively simple construction and can be made economically. Like the sinkers 10 and 20, the sinker 30 is also made of iron by forging.

The embodiments of the present invention described above are to be regarded in all respects as merely illustrative and not restrictive. Accordingly, the present invention may be embodied in other specific forms without deviating from the spirit thereof. The present invention is therefore to be limited only by the scope of the hereinafter appended claims.

What is claimed is:

1. An iron fishhook sinker comprising:
   a first weight,
   a second weight,
   each said first weight and said second weight having;
   a flatside surface,
   an elongated slot formed on said flatside surface,
   a communicating semi-circular hole at an end of said elongated slot,
   at least one projection on said flatside surface, and
   at least one cavity on said flatside surface,
   wherein, said at least one projection on said first weight and on said second weight respectively engage said at least one cavity on said second weight and on said first weight; and
   said elongated slot and said communicating semi-circular hole on said first weight and on said second weight respectively forming an elongated cylindrical hole communicating with a circular hole,
   wherein, a heat at an end of an eyelet device can be rotatably engaged in said circular hole, while said cylindrical hole permits a loop at an opposite end of said eyelet device to be located outside said sinker.

2. An iron fishhook sinker comprising;
   a first weight,
   a second weight,
   each said first weight and said second weight having;
   a flatside surface,
   a curved elongated slot formed on said flatside surface,
   at least one projection on said flatside surface, and
   at least one cavity on said flatside surface,
   wherein, said at least one projection on said first weight and on said second weight respectively engage said at least one cavity on said second weight and on said first weight; and
   said curved elongated slot on said first weight and on said second weight forming a curved elongated cylindrical hole,
   wherein, said curved elongated cylindrical hole permits engagement of a curved fishhook corresponding to a curve of said curved elongated cylindrical hole.

3. The fishhook sinker of claim 1 wherein said at least one projection has a height slightly greater than a depth of said at least one cavity.

4. The fishhook sinker of claim 2 wherein said at least one projection has a height slightly greater than a depth of said at least one cavity.

5. A method of making a fishhook sinker of iron comprising the steps of:
   (a) providing a first iron member with one side having an arcuate surface and with another side having a plane surface provided with a slot of an appropriate length and shape, a circular projection on a first side of said slot and a circular hole on a second side of said slot of a depth slightly shorter than a length of said circular projection;
   (b) uniting said first iron member with a plane surface of a second iron member symmetrical to said first iron member such that said circular projection of said first iron member is inserted into a circular hole of said second iron member and that a circular projection of said second iron member is inserted into said circular hole of said first iron member; and
   (c) pressing said first iron member and said second iron member and then allowing an electric current to flow through said first iron member and said second member so that said circular projection is fused to said circular hole in such manner that said slot of said first iron member and a slot of said second iron member form an elongated hole.

6. The method according to claim 5 wherein a fishhook is lodged in said slot of either said first iron member or said second iron member before said first iron member or said second iron member are united.

* * * * *